United States Patent Office 2,940,900
Patented June 14, 1960

2,940,900
DRY VITAMIN E COMPOSITION

Charles H. Benton, Jr., and Lawrence A. Anderson, Rochester, N.Y., assignors to Eastman Kodak Company, Rochester, N.Y., a corporation of New Jersey No Drawing. Filed Sept. 25, 1957, Ser. No. 686,043

4 Claims. (Cl. 167—81)

The present invention concerns a product containing a vitamin E-active material.

Vitamin E-active products are commonly incorporated into pharmaceutical preparations for human applications. Also, animal nutritionists have recommended that animal feeds be supplemented with a vitamin E-active material. It has been reported than animals fed on feeds deficient in vitamin E-active material tend to acquire various disorders such as encephalomalacia, enlarged hock disorder, symptoms of muscular dystrophy, myopathy of the gizzard and numerous other disorders. Thus, vitamin E-active materials are widely used materials of commerce.

Vitamin E materials such as $\alpha$-tocopherol and $\alpha$-tocopheryl acetate are oil soluble vitamin materials. The oily or oleaginous nature of vitamin E materials poses special problems when incorporating these materials in pharmaceutical preparations, foods, animal feeds and the like.

It is oftentimes desirable to be able to prepare vitamin E-active materials in tablet form at potencies up to 100 I.U. or more per 6 grain tablet. However, many commonly employed carriers for oleaginous vitamin E materials are either not suitable for tableting or they must, by their physical nature, comprise such a large portion of the material being tableted that the tablet is inherently of a low potency. Also, the vitamin E material in many compositions tends to oil-out when subjected to tableting.

Likewise, it is oftentimes desirable to have a vitamin E-containing product that can be readily dispersed in cold water, such products having utility in aqueous pharmaceutical preparations, as additives to animal drinking water, for spraying on dry animal feeds and for related uses. However, many vitamin E-containing products are comprised of carrier components that are not soluble or are not readily dispersed in water. Also, many vitamin E-containing products are of such a character that the oily or oleaginous vitamin E material therein does not readily disperse in water.

Another property desired of vitamin E-containing products is a suitability for incorporation in animal feeds. Such products must be dry, free flowing materials that can be readily uniformly dry-blended with animal feeds. Additionally, the vitamin E material in such products must be stable against oxidative destruction for substantial periods of time. Many known vitamin E-containing products are lacking in such properties.

There have been numerous largely unsuccessful attemps to prepare commercially dry, free-flowing vitamin E products, since the methods and techniques employed to prepare many commercial vitamin E-containing products, as well as the inherent nature of the components comprising such products, result in products having properties that lend to the products' limited utility. For example, in the base of beaded products prepared by spray drying or spray chilling vitamin E-containing compositions in the usual manner, the size and surface of the beadlets are such that such products are oftentimes difficult to wet or disperse in water. Also, products prepared with gellable carriers such as gelatin are not readily dispersed in cold water, as well as not having the desired properties for tableting. Aditionally, products having solid fats and flours or starches incorporated therein or thereon are by their very nature low potentcy products in addition to being non-dispersible in water.

It would thus be desirable to have a substantially dry, free-flowing vitamin E composition comprised of a non-gellable solid carrier material suitable for retaining in a substantially non-oily solid form, and for dispersing in aqueous media, substantial amounts of oleaginous concentrates of vitamin E-active material.

It is accordingly an object of this invention to provide a novel vitamin E-containing product having a wide range of uses.

It is another object of this invention to provide a novel combination of process steps especially adapted for preparing a new and improved vitamin E-containing composition not subject to the disadvantages inherent in the prior art products.

It is a further object of the invention to provide a substantially dry, free-flowing composition comprised of a non-gellable solid carrier material suitable for retaining in a substantially non-oily solid form, and for dispersing in aqueous media, substantial amounts of oleaginous concentrates of vitamin E-active material.

It is also an object of this invention to provide a novel vitamin E-containing composition that can be readily dispersed in cold water.

It is likewise an object of this invention to provide a new and improved vitamin E-containing composition particularly suited for preparing high potency vitamin E tablets.

It is an additional object of this invention to provide a new, dry, free-flowing particulate material that is especially useful for fortifying animal feeds with vitamin E-active material.

These and other objects are attained by means of this invention as described more fully hereinafter with particular reference to certain preferred embodiments.

The vitamin E-containing composition of the present invention is prepared by providing a mixture comprised of water, gum acacia and an oleaginous concentrate of a vitamin E-active material; emulsifying this mixture so that the concentrate of vitamin E-active material is substantially uniformly dispersed therein in minute globules; spreading the resulting emulsion in a thin layer on an evaporating surface; rapidly removing substantially all of the water from the thin layer on the evaporating surface at correlated time and temperature conditions to produce a substantially dry, porous, frangible sheet; removing the resulting dried composition from the evaporating surface; and thereafter comminuting the removed dried composition to the desired particle size. The vitamin-containing product prepared by such a process is a dry, free-flowing, particulate composition possessing properties highly desired for pharmaceutical uses, and for the fortification of animal feeds, such properties being described in more detail hereinafter.

"Vitamin E" is the term usually given to $\alpha$-tocopherol, $\alpha$-tocopherol being the tocopherol having the highest vitamin E biological activity. Thus, for maximum potency, $\alpha$-tocopherol or its acyl esters are employed in the preparation of the present composition. However, minor proportionate amounts of non-$\alpha$-tocopherol materials such as $\gamma$-tocopherol, $\delta$-tocopherol and $\beta$-tocopherol or their acyl esters, preferably alkyl esters, in admixture with $\alpha$-tocopherol or its acyl esters, can also be utilized and are included with the term "vitamin E." The acetate ester of $\alpha$-tocopherol, because of its high stability against oxidative destruction is preferably employed in the present invention. Vitamin E-active materials are more generally commercially available in oil or oleaginous concentrates. The present composition can be suitably prepared to contain up to about 60% and more usually 5–60%, by weight of an oleaginous concentrate of a vitamin E-active material, although oleaginous concentrates of about 15–45% by weight preferably comprise the present composition. To prepare products having such concentrations of oleaginous vitamin-E active material in accordance with the invention, aqueous emulsions containing up to about 40%, and more usually about 2–40%, by weight of oleaginous concentrates of vitamin E-active material can be suitably used, although amounts of about 5–25% by weight are preferably employed. The oleaginous concentrates of vitamin E-active material employed desirably contain at least 175 I.U. of vitamin E per gram, although lower potency materials can be utilized. The water is rapidly removed from such emulsions in the manner described hereinafter in detail to prepare the instant dry, free-flowing, particulate vitamin E-active composition. As the compositions prepared by the present process can contain up to 60% by weight of an oleaginous concentrate of a vitamin E-active material, such compositions can be prepared in particularly high potencies. For example, dry compositions having vitamin E potencies up to 800 I.U. per gram and higher can be prepared by the present process, although the present dry compositions are more generally prepared in concentrations of about 100–600 I.U. per gram.

Gum acacia is the carrier material for the oleaginous vitamin E material. The dry, free-flowing product of the invention contains about 30–95%, and preferably 40–70%, by weight of gum acacia, such a dry product resulting from removing the water from an aqueous emulsion comprised of about 10–60% by weight of gum acacia. About 15–45% by weight of gum acacia is preferably used in the emulsion of the present process.

The gum acacia is preferably plasticized with a sugar such as sucrose, glucose, invert sugar or the like. The emulsion of the instant process can be prepared with up to about 25% by weight of sugar, up to about 20% by weight of sugar being more usually used in the emulsion. Such emulsions are dried in accordance with the present process to form products containing up to about 30% or even 35% by weight of sugar. However, the presence of substantially more sugar results in a composition that tends to absorb moisture and become sticky or gummy, and thus, the free-flowing property characterizing the present composition is oftentimes not present to the desired degree in high sugar content products. Also, the use of substantially more sugar in the emulsion produces a viscous, syrupy mixture that is difficult to dry in the desired porous and substantially non-oily form.

The proportions of the components comprising the aqueous emulsion in the present process are correlated so that the dried product prepared therefrom is comprised of 40–95%, and preferably 50–95% by weight of gum acacia plus sugar, with the gum acacia comprising at least 30% by weight of the dried product.

The oleaginous concentrate of vitamin E-active material, gum acacia, and sugar if used, are emulsified with water to produce a substantially uniform emulsion, the water comprising about 35–60% by weight of the emulsion. The amount of water used in the emulsion varies with the constituents of the emulsion. To permit the desired emulsification of the oleaginous material in the aqueous medium within a practical time, to allow practical pumping and feeding to the dryer, and to facilitate the spreading of the emulsion in a thin layer on the evaporating surfaces of the dryer, the amount of water in the emulsion is preferably adjusted to give an emulsion having a viscosity of about 500–2000 centipoises, although emulsions having viscosities up to about 20,000 centipoises can be suitably utilized. This mixture of components is emulsified or homogenized until the oleaginous material is substantially uniformly dispersed in the emulsion in globules or droplets of which substantially all are less than about 2 microns in diameter and preferably less than about 1 micron in diameter. Such an aqueous emulsion can be readily prepared with high speed mixers, blenders and agitators, as well as with conventional dairy-type homogenizers.

The resulting emulsion is spread in a thin layer on an evaporating surface. Substantially all of the water is rapidly removed from the resulting thin layer of emulsion at correlated time and temperature conditions of 3–60 seconds at 240–350° F. and preferably at 275–325° F. to produce a substantially dry, porous frangible sheet. We have found that the requisite structure can be achieved, provided the emulsion is spread on the evaporating surface in a layer sufficiently thin to produce a dried layer about .02–.055 inch in thickness, such an emulsion layer being varied with the amount of water in the emulsion, but usually being varied from about .01–.05 inch in thickness. Depending on the drying conditions and the proportions of the components in the aqueous emulsion, the thickness of the porous layer dried on the evaporating surface usually varies in thickness from about equal to, to about twice the thickness of the aqueous emulsion initially spread on the evaporating surface. Thus, a very porous composition can be prepared by the present process. Suitable methods of rapid evaporation of the water from the emulsion include conventional drum dryers. Both single drum dryers and double drum dryers can be employed. Double drum dryers are preferably used, and with such dryers, the emulsion is introduced to the dryer between two steam-heated revolving drums which are spaced in very close proximity to one another and which rotate on fixed axes toward each other. The emulsion is held in the trough formed by the two drums from whence it is picked up as a thin layer and rapidly dried to a thin sheet on the outer surfaces of the revolving drums.

The dried gum acacia composition is removed from the evaporating surfaces of the dryer and comminuted to a free-flowing particulate composition. The dried gum acacia composition is more usually removed from the dryer as a thin, porous, frangible sheet, although some of the present formulations and drying conditions result in sheets more frangible than others, such sheets oftentimes breaking up in part into flakes or even granules on being conveyed from the dryer. The removal of the dried gum acacia composition from the dryer substantially completely as sheets or large flakes, or distinguished from powders, facilitates the control of the particle size on subsequent grinding and is especially useful for preparing particles of about 60 mesh or larger. The porous, frangible sheet or flakes can be readily comminuted or pulverized to the desired size in the usual manner with any of the commonly employed granulators. The product is desirably comminuted so that essentially all of the product is in the size range of about 10–100 mesh, and thereafter preferably screened to be substantially all in the size range of about 20–80 mesh. Mesh sizes used herein are of the U.S. Sieve Series.

When the product of the present invention is incorporated as an aqueous dispersion in animal and poultry drinking water, or when sprayed as an aqueous dispersion on animal feeds, it is desirable to incorporate a small amount of a mold inhibitor therein. For most purposes, about 0.1% of mold inhibitor based on the weight of the present dried composition is sufficient, and usually more than 1% of most mold inhibitors is not necessary. Any of the well-known mold inhibitors can be utilized, including such compounds as methyl parahydroxybenzoate, sodium crotonate, sodium benzoate, sorbic acid, and the like.

Additionally, a small amount of a color imparting material can be added to the present emulsions prior to removing the water therefrom for use in products that are to be dry-blended with poultry feeds. Such color imparting material can be used to lend to the present gum acacia composition essentially the same coloration as the dry feed material to be fortified. Poultry, such as chickens, oftentimes are color selective when eating, and thus, a substantially uniformly colored feed increases the probability that the chickens in a flock will all get equal doses of the vitamin E material in the feed. A preferred colorant is alfalfa leaf meal which imparts a light green coloration to the present particulate composition. However, other coloring materials can be employed, including water soluble and oil soluble dyes. The amount of colorant employed varies with the color desired and the coloring properties of the colorant. Alfalfa leaf meal is incorporated into the present emulsions prior to drying in amounts of at least 2% by weight and suitably up to 15% by weight, although amounts of 2–10% by weight are preferably utilized.

The gum acacia carrier is the sole colloidal constituent in the present product and it is particularly adapted as a carrier for the oleaginous concentrate of vitamin E-active material. Gum acacia can be readily dispersed in cold water and this carrier facilitates the emulsification of the minute globules of oleaginous vitamin E material when reconstituting the present dried composition in water. Also, gum acacia is a non-gellable material from which water can be readily substantially completely removed from a dispersion or emulsion thereof. In the present process, the oleaginous material in the emulsion is reduced to globules of less than about 2 microns and preferably less than about 1 micron in diameter. The resulting emulsion is rapidly dried in a thin layer under the specific conditions described above. In the drying process, water is rapidly "boiled" out of the aqueous emulsion leaving a dried gum acacia composition having the oleaginous globules uniformly dispersed in a porous, "dehydrated emulsion" structure. No appreciable coalescence of the oleaginous globules occurs during the drying or dehydration step. The dried emulsion is then comminuted to form the present product. This product, because of its composition and porous or irregular shape, can be readily wetted or water dispersed, can be dry blended with animal feeds with a minimum of classification, and can be easily compressed into tablet form. Also, the use of gum acacia in the particular emulsification and drying processes described above results in the preparation of a dry composition capable of having incorporated therein a particularly high concentration of oleaginous vitamin E-active concentrate. The above-described combination of process steps, effected in the above-described sequence and under the present carefully controlled conditions results in the instant new and improved dry, free-flowing, particulate vitamin E composition. The invention is illustrated by the following examples which describe preferred embodiments thereof.

Example 1

In 7.025 parts by weight of water at room temperature was dissolved 5.09 parts by weight of gum acacia (U.S.P. grade) with agitation. To the resulting solution was added 1.09 parts by weight of a distilled d-α-tocopheryl acetate oil concentrate derived from soybean oil and containing 514 mg. of d-α-tocopheryl acetate per gram, .826 part by weight of sucrose and .0194 part by weight of the mold inhibitor, methyl parahydroxybenzoate. The resulting mixture was vigorously agitated for about 25 minutes with an impeller-type agitator ("Cowles Dissolver") to produce an emulsion having a viscosity of about 1000 centipoises and having substantially all of the d-α-tocopheryl acetate concentrate dispersed therein in globules less than 1 micron in diameter. The size of the globules in the emulsion was determined by diluting a sample of the emulsion with 5 volumes of water and viewing a drop of the diluted sample under magnification of 430×. The water was thereafter rapidly removed from the resulting emulsion on a double drum dryer having stainless steel evaporating surfaces at a temperature of about 310° F. The emulsion was spread on the evaporating surfaces of the dryer in layers at a thickness of about .02 inch and thereafter the emulsion layers were dried on the evaporating surfaces of the dryer for a period of about 4 seconds to produce substantially dry, porous, frangible sheets. The dried sheets were removed from the dryer as sheets by means of scrapers and thereafter pulverized with a rotary cutter to produce a substantially non-oily, dry, free-flowing particulate composition essentially between 30 and 100 mesh in size. The resulting particulate composition had a vitamin E potency of about 52,500 I.U. per pound, was dispersible in cold water, could be tableted and was suitable for incorporation in dry animal feed mixes.

Example 2

An emulsion was prepared in accordance with the method described in Example 1 with the following components in lieu of those employed in Example 1: 18.2% by weight of a distilled d-α-tocopheryl acetate oil concentrate derived from soybean oil and containing about 514 mg. of d-α-tocopheryl acetate per gram, 8.1% by weight of sucrose, 25% by weight of gum acacia (U.S.P. grade), 46% by weight of water and 2.7% by weight of finely ground alfalfa leaf meal as a colorant. The resulting emulsion had a viscosity of 2800 centipoises. The emulsion was further emulsified with about one tenth more by weight of water to form an emulsion having a viscosity of about 900 centipoises. The water was rapidly evaporated from the diluted emulsion and the resulting dried composition was pulverized by the methods described in Example 1 to produce a dry, free-flowing particulate material having a vitamin E potency of about 105,000 I.U. per pound. The resulting vitamin E-active composition is particularly adapted for use in animal and poultry feed premixes. This vitamin E composition has a coloration resembling many dry poultry feeds, and thus, when incorporated in such feeds, color selectivity of the added vitamin E-active composition by the poultry is significantly reduced or eliminated. Also, the vitamin E-active composition is stable for extended periods of time against oxidative destruction in animal feeds.

Example 3

An emulsion was prepared in accordance with the method described in Example 1 with the following components in lieu of those employed in Example 1: 19.3% by weight of a distilled d-α-tocopheryl acetate oil concentrate derived from soybean oil and containing about 95% by weight of d-α-tocopheryl acetate, 30.7% by weight of gum acacia (U.S.P. grade), and 50% by weight of water. The resulting emulsion had a viscosity of 1200 centipoises. The water was rapidly evaporated from the resulting emulsion and the resulting dried composition was pulverized by the methods described in Example 1 to produce a dry, free-flowing particulate material having a vitamin E potency of about 525 I.U. per gram. The resulting vitamin E-active composition could be readily dispersed in cold water. It is desirable to have a vitamin E product that can be readily dispersed in ordinary tap water for incorporation into animal and poultry drinking water. The vitamin E material in such dispersions should remain in a stable dispersed form for at least 1 day and preferably 2 days. The present vitamin E-active composition was dispersed in several portions of tap water at about 6° C. by stirring. Sufficient vitamin E-active composition was added to provide samples containing water dispersions having vitamin E potencies of 10 I.U. per 100 ml. of water and 100 I.U. per 100 ml. of water. The resulting dispersions were stored at 6° C. and 20° C. for a period of 10 days with no detectable loss of vitamin E potency or break-down of the dispersions. Also, the dry vitamin E-active product can be readily incorporated into tablets containing at least 100 I.U. per 6 grain tablet. The dry vitamin E-active product is preferably leached with a solvent such as hexane before tableting.

Accordingly, the invention provides a method for preparing a novel vitamin product having a wide range of uses. The present novel combination of cooperating materials and process steps which are effected under the carefully controlled conditions described hereinabove are especially adapted to prepare the instant new and improved vitamin E-containing composition.

Although the invention has been described in detail with particular reference to certain typical embodiments, it will be understood that variations and modifications can be effected within the spirit and scope of the invention as described hereinabove and as defined in the appended claims.

We claim:

1. The process for preparing a dry, free-flowing particulate composition having substantial vitamin E activity which comprises providing a mixture comprised of 35–60% by weight of water, 10–60% by weight of gum acacia, 0–25% by weight of sugar, and 2–40% by weight of an oleaginous concentrate of vitamin E-active material; emulsifying said mixture to produce an emulsion having said oleaginous concentrate substantially uniformly dispersed therein in minute globules, substantially all of said globules being less than 2 microns in diameter; spreading said emulsion in a layer substantially .01–.05 inch in thickness on the evaporating surface of a drum dryer; removing substantially all of the water from the said emulsion layer on said evaporating surface at correlated time and temperature conditions of 3–60 seconds and at 240–350° F. to produce a substantially dry, porous, frangible sheet; removing the resulting dried composition from said evaporating surface; and thereafter comminuting the said removed dried composition; the proportions of the components comprising the said aqueous emulsion being correlated so that said dried composition is comprised of 40–95% by weight of gum acacia plus sugar, with at least 30% by weight of said dried composition being gum acacia.

2. The process described in claim 1 wherein the oleaginous concentrate of vitamin E-active material comprises α-tocopheryl acetate.

3. The process for preparing a dry, free-flowing, particulate composition having substantial vitamin E activity which comprises providing a mixture comprised of 35–60% by weight of water, 15–45% by weight of gum acacia, 0–20% by weight of sucrose, and 5–25% by weight of an α-tocopheryl acetate concentrate; emulsifying said mixture to produce an emulsion having said α-tocopheryl acetate concentrate substantially uniformly α-tocopheryl acetate concentrate substantially uniformly dispersed therein in minute globules, substantially all of said globules being less than 1 micron in diameter; spreading said emulsion in a layer substantially .01–.05 inch in thickness on the evaporating surface of a drum dryer; removing substantially all of the water from the said emusion layer on said evaporating surface at correlated time and temperature conditions of 3–60 seconds and at 275–325° F. to produce a substantially dry, porous, frangible sheet; removing the resulting dried composition from said evaporating surface; and thereafter comminuting the said removed dried composition; the proportions of the components comprising the said aqueous emulsion being correlated so that said dried composition is comprised of 40–95% by weight of gum acacia plus sucrose, with at least 30% by weight of said dried composition being gum acacia.

4. A dry, free-flowing, particulate composition prepared by the method described in claim 1.

References Cited in the file of this patent

UNITED STATES PATENTS

| | | |
|---|---|---|
| 2,375,279 | Buxton | May 8, 1945 |
| 2,562,840 | Caldwell | July 31, 1951 |
| 2,650,895 | Wallenmeyer | Sept. 1, 1953 |
| 2,689,202 | Bavley | Sept. 14, 1954 |